(12) United States Patent
Gherghescu et al.

(10) Patent No.: US 10,044,273 B2
(45) Date of Patent: Aug. 7, 2018

(54) MULTI-PHASE SWITCHING CONVERTER

(71) Applicant: Dialog Semiconductor (UK) Limited, London (GB)

(72) Inventors: Alin Gherghescu, Campbell, CA (US); Amit Bavisi, Los Gatos, CA (US); Ershad Ahmed, San Jose, CA (US); Narendra Nath Gaddam, Kattangoor (IN); Vineet Tiwari, San Jose, CA (US)

(73) Assignee: Dialog Semiconductor (UK) Limited, London (GB)

(*) Notice: Subject to any disclaimer, the term of this patent is extended or adjusted under 35 U.S.C. 154(b) by 0 days.

(21) Appl. No.: 15/718,572

(22) Filed: Sep. 28, 2017

(65) Prior Publication Data
US 2018/0175734 A1  Jun. 21, 2018

Related U.S. Application Data (60) Provisional application No. 62/437,158, filed on Dec. 21, 2016.

(51) Int. Cl.
*H02M 3/158* (2006.01)

(52) U.S. Cl.
CPC .. *H02M 3/1584* (2013.01); *H02M 2003/1586* (2013.01)

(58) Field of Classification Search
CPC ............ H02M 3/1584; H02M 2003/1586
See application file for complete search history.

(56) References Cited

U.S. PATENT DOCUMENTS

| | | | | |
|---|---|---|---|---|
| 6,465,993 B1* | 10/2002 | Clarkin | ............ | H02M 3/156 323/272 |
| 7,109,692 B1* | 9/2006 | Wu | ............ | H02M 1/44 323/282 |
| 7,492,134 B2* | 2/2009 | Tang | ............ | H02M 3/1584 323/241 |
| 8,188,721 B2* | 5/2012 | Isham | ............ | H02M 3/156 323/282 |
| 2010/0123445 A1 | 5/2010 | Kim et al. | | |
| 2014/0266085 A1 | 9/2014 | Unno | | |
| 2015/0077079 A1 | 3/2015 | Ejury | | |
| 2016/0268904 A1 | 9/2016 | Melendy et al. | | |
| 2017/0248996 A1* | 8/2017 | Zhang | ............ | G06F 1/26 |
| 2018/0006558 A1* | 1/2018 | Gallina | ............ | H02M 3/158 |

* cited by examiner

*Primary Examiner* — Emily P Pham
(74) *Attorney, Agent, or Firm* — Saile Ackerman LLC; Stephen B. Ackerman (57) ABSTRACT

A method and a circuit of operating a multi-phase switching converter is presented. The circuit contains a plurality of phase circuits. The method includes setting an adaptive voltage positioning parameter of an adaptive voltage positioning controller and controlling an output voltage of the multi-phase switching converter using the adaptive voltage positioning controller. The method further includes generating a threshold voltage value based on the adaptive voltage positioning parameter, comparing the output voltage of the multi-phase switching converter with the threshold voltage value and performing at least one of enabling and disabling a phase circuit based on the comparison.

15 Claims, 9 Drawing Sheets

MULTI-PHASE SWITCHING CONVERTER

This application claims priority to U.S. Provisional Application No. 62/437,158, filed on Dec. 21, 2016, and is owned by a common assignee and which is herein incorporated by reference in its entirety.

TECHNICAL FIELD

The present disclosure relates to an apparatus and methods for regulating an output of a multi-phase switching converter.

BACKGROUND

Multi-phase switching converters present a number of advantages over single phase switching converters. In particular, multi-phase switching converters exhibit greater efficiency than single-phase switching converters for large load currents. For small load currents, efficiency can be improved by operating the multi-phase switching converter in a single-phase mode of operation.

Upon switching between multi-phase and single-phase modes, the switching converter can exhibit a poor transient response resulting in undershoot or overshoot of the output voltage.

Such overshoots and undershoots may be reduced by implementing adaptive voltage positioning AVP control techniques. When using AVP control, the output voltage can vary between a minimum value and a maximum value and can remain at or close to these values. The AVP resistance, $R_{AVP}$, is expressed as the ratio of the change in output voltage over the change in load current. The AVP resistance can be set to a specific value depending on a specific application.

When $R_{AVP}$ is changed, a current value at which phase circuits of the multi-phase switching converter are enabled or disabled also changes. This reduces the efficiency of the multi-phase switching converter.

SUMMARY

It is an object of the disclosure to address one or more of the above-mentioned limitations. According to a first aspect of the disclosure, there is provided a method of operating a multi-phase switching converter comprising a plurality of phase circuits, the method comprising setting an adaptive voltage positioning parameter of an adaptive voltage positioning controller; controlling an output voltage of the multi-phase switching converter using the adaptive voltage positioning controller; generating a threshold voltage value based on the adaptive voltage positioning parameter; comparing the output voltage of the multi-phase switching converter with the threshold voltage value; and performing at least one of enabling and disabling a phase circuit based on the comparison.

Optionally, the method comprises enabling the phase circuit when the output voltage is less than the voltage threshold and disabling the phase circuit when the output voltage is more than the voltage threshold.

Optionally, generating a threshold voltage comprises generating a current that is a function of the adaptive voltage positioning parameter.

Optionally, generating a threshold voltage value comprises generating a first threshold value associated with a first phase circuit and generating a second threshold value associated with a second phase circuit, wherein the first threshold value is greater than the second threshold value.

Optionally, the method comprises enabling the first circuit when the output voltage is less than the first voltage threshold and disabling the first circuit when the output voltage is more than the first voltage threshold, and enabling the second circuit when the output voltage is less than the second voltage threshold and disabling the second circuit when the output voltage is more than the second voltage threshold.

Optionally, the method may comprise adjusting the threshold voltage value when a phase circuit is enabled or disabled. This approach may be used to limit or prevent mode bouncing.

Optionally, the threshold voltage value may be adjusted momentarily for a specific time period. For example, the time period may be set for a duration that is long enough to allow the output voltage of the converter to recover from an undershoot or an overshoot.

Optionally, the threshold voltage value may be decreased when a phase circuit is disabled.

According to a second aspect of the disclosure, there is provided a multi-phase switching converter for providing an output voltage, comprising a plurality of phase circuits; an adaptive voltage positioning controller coupled to the plurality of phase circuits, comprising a programmable circuit for setting an adaptive voltage positioning parameter; a voltage threshold generator coupled to the plurality of phase circuits adapted to generate a first voltage threshold value based on the adaptive voltage positioning parameter; a first comparator coupled to the voltage threshold generator and to a first phase circuit, adapted to compare the output voltage with the first threshold value and to provide a first signal to perform at least one of enabling or disabling the first phase circuit based on the comparison.

Optionally, the voltage threshold generator is adapted to generate a second voltage threshold value based on the adaptive voltage positioning parameter, wherein the first threshold value is greater than the second threshold value; and the multi-phase switching converter comprises a second comparator coupled to the voltage threshold generator and to a second phase circuit, the second comparator being adapted to compare the output voltage with the second threshold value and to provide a second signal to perform at least one of enabling or disabling the second phase circuit based on the comparison.

Optionally, the first signal is adapted to enable the first circuit when the output voltage is less than the first voltage threshold and to disable the first circuit when the output voltage is equal or greater than the first voltage threshold, and wherein the second signal is adapted to enable the second circuit when the output voltage is less than the second voltage threshold and to disable the second circuit when the output voltage is equal or greater than the second voltage threshold.

Optionally, the adaptive voltage positioning parameter is associated with an adaptive voltage positioning resistance value.

Optionally, the multi-phase switching converter comprises a voltage threshold adjuster coupled to the voltage threshold generator, the voltage threshold adjuster being adapted to adjust the threshold voltage value when a phase circuit enabled or disabled.

Optionally, the threshold voltage value may be adjusted momentarily for a specific time period.

Optionally, the threshold voltage value may be decreased when a phase circuit is disabled.

BRIEF DESCRIPTION OF THE DRAWINGS

The disclosure is described in further detail below by way of example and with reference to the accompanying drawings, in which.

DESCRIPTION

Figure 1:
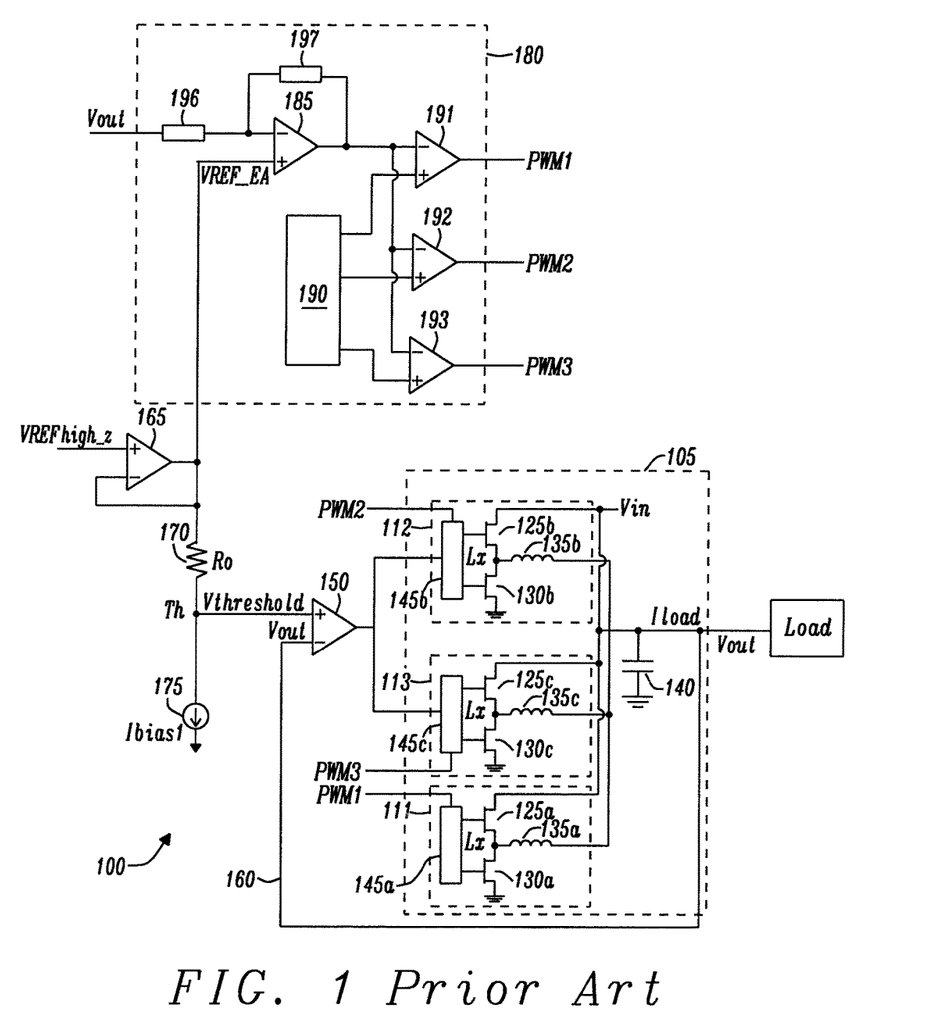
FIG. 1 is a diagram of a multi-phase buck converter according to the prior art.

FIG. 1 illustrates a diagram of a multi-phase buck converter 100 that includes a plurality of phase circuits 105. The plurality of phase circuits 105 includes a first phase circuit 111, a second phase circuit 112 and a third phase circuit 113. Each phase circuit includes a high side power switch 125 and a low side power switch 130 that are connected to an inductor 135 via a switching node Lx. The inductor 135 has a first terminal coupled to the Lx node and a second terminal corresponding to an output of the phase circuit. The outputs of the phase circuits are coupled to a common node that is coupled to a load. A capacitor 140 has a first terminal coupled to the common node and a second terminal coupled to ground. Each converter circuit includes a gate driver 145 that has two outputs coupled to the high side power switch 125 and the low side power switch 130, respectively. The switching frequency of each phase circuit operates with a phase shift relative to the other converter circuits and therefore each phase circuit has an associated phase.

A threshold comparator 150 has a first input for receiving a threshold voltage and a second input for receiving the output voltage Vout. The threshold comparator has an output coupled to the gate drivers 145b and 145c of the second and third phase circuits. The threshold comparator 150 is coupled to the load of the multi-phase buck converter 105 using a Kelvin connection 160 to receive the output voltage Vout. The Kelvin connection 160 is used to sense the output voltage Vout directly at the load to ensure that there is no voltage drop in the wire connecting the load to the second input, therefore Vout corresponds to the voltage at the point of load.

An operational amplifier configured as a unity gain amplifier 165 has a first input for receiving a reference voltage, VREFhigh_z. The operational amplifier 165 has a second input that is coupled to an output of the operational amplifier 165. The output of the operational amplifier 165 is the voltage VREF_EA. The output of the operational amplifier 165 is coupled to a resistor Ro, 170, connected in series with a current source 175 at a threshold node Th.

A threshold voltage Vthreshold at the node Th can be expressed as:

$$V\text{threshold} = V\text{REFhigh}_z - Ro \times I\text{bias1} \quad (1)$$

Where Ibias1 is constant current generated by the current source 175. As VREFhigh_z, Ro and Ibias1 are fixed values, Vthreshold is also fixed.

A three-phase pulse width modulation (PWM) controller 180 comprises an error amplifier 185, a clock and ramp generator 190 and a plurality of PWM comparators 191, 192, 193 to generate digital control signals for operation of the phase circuits 111, 112, 113.

The error amplifier 185 has a first input coupled to resistor 196 and a second input for receiving the voltage VREF_EA. The resistor 196 has a first terminal coupled to Vout and a second terminal coupled to the first input of the error amplifier 185. A second resistor 197 has a first terminal coupled to the first input of the error amplifier 185 and a second terminal coupled to an output of the error amplifier 185.

Each PWM comparator has a first input coupled to the output of the error amplifier 185 and a second input coupled to the clock and ramp generator 190. An output of the first PWM comparator 191, given by PWM1, is coupled to an input of the gate driver 145a of the first phase circuit 111. An output of the second PWM comparator 192, given by PWM2, is coupled to an input of the gate driver 145b of the second phase circuit 112. An output of the third PWM comparator 193, given by PWM3, is coupled to an input of the gate driver 145c of the third phase circuit 113. The outputs of the PWM comparators 191, 192, 193 are digital signals resulting from the comparison between the output of the error amplifier 185 and the voltage generated by the clock and ramp generator 190.

Figure 2:
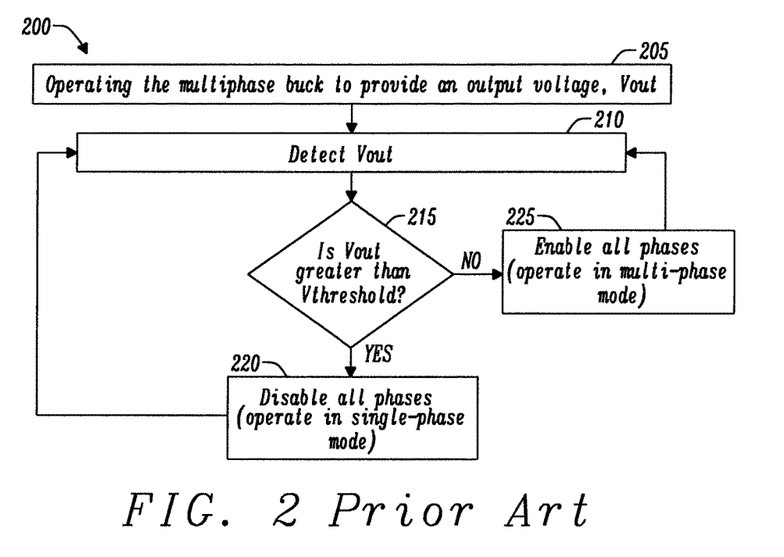
FIG. 2 is a flow diagram illustrating the working of the converter of FIG. 1.

FIG. 2 shows a flow chart 200 of the method of controlling the enabling and disabling of phases of the multi-phase buck converter using the circuit illustrated in FIG. 1. At step 205 an output voltage Vout is generated by the multi-phase buck converter. At step 210 Vout is detected. At step 215 Vout is compared with the threshold voltage Vthreshold. If Vout is greater than Vthreshold, the threshold comparator 150 outputs a logic signal to the gate drivers 145 that deactivates the second and third phase circuits 112, 113 if they are activated (step 220). For example, this may correspond to both the high side and the low side switches for the corresponding phase circuits being opened. In this case the multi-phase buck converter will operate in single-phase mode. If Vout is less than Vthreshold, the threshold comparator 150 outputs a logic signal to the gate drivers 145 that activates the second and third phase circuits 112, 113 if they are deactivated (step 225). In this case, all phase circuits are activated and the buck converter acts in multi-phase mode. The process flow is repeated and therefore the circuit responds in line with the flow chart during its operation. Transient response and power losses of switching converters can be improved by implementing adaptive voltage positioning control.

Figure 3:
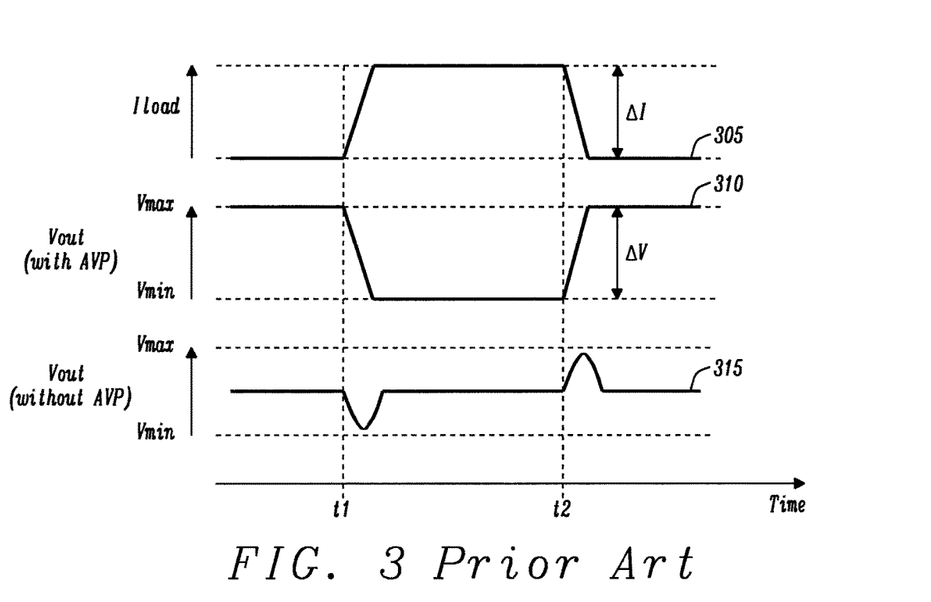
FIG. 3 is a diagram illustrating the behaviour of a switching converter provided with a conventional adaptive voltage positioning controller.

FIG. 3 illustrates the profile of a current load 305 along with the profile of output voltage Vout of a switching converter with adaptive voltage positioning AVP control 310 and without AVP control 315.

At time t1 the current load 305 increases from a light load condition to and heavy load condition. At time t2 the current load decreases from the heavy load condition back to the light load condition.

Considering first the case of a switching converter without AVP control, when the current load 305 increases at time t1, the output voltage 315 decreases to a minimum voltage Vmin and returns shortly after to its initial value. A similar transient occurs at time t2, when the output voltage 315 increases to a maximum voltage Vmax before returning to its initial value.

Using AVP control, the output voltage 310 is allowed to vary between the minimum value Vmin and the maximum value Vmax and to remain at or close to these values. Using this technique, it is possible to reduce the transient responses of the output voltage significantly. It also allows to limit power losses.

At time t1, the output voltage decreases to Vmin and remains substantially constant until time t2, when Vout increases back to Vmax. An AVP resistance $R_{AVP}$ can be expressed as:

$$R_{AVP} = \Delta V/\Delta I, \quad (2)$$

where $\Delta V$ is the change in output voltage $\Delta V=V_{max}-V_{min}$ and $\Delta I$ is the change in load current $\Delta I=I_{max}-I_{min}$.

The AVP resistance $R_{AVP}$, can be set to a specific value depending on a specific application.

The multi-phase buck converter of FIG. 1, can be modified to implement AVP control. In this case, the threshold value, Vthreshold would change for different values of $R_{AVP}$.

For example, considering a threshold current $I_{Th}$ at which the phase circuits are enabled or disabled of 4 A and an AVP resistance $R_{AVP}$, of 5 mΩ, the threshold voltage $V_{th}$ would be 20 mV in accordance with equation (2). Therefore, setting Vthreshold to 20 mV will result in the comparator enabling or disabling the phase circuits when the load current Iload is equal to 4 A.

However, if $R_{AVP}$ is set to a different value, for example to 10 mΩ, then Vthreshold will remain fixed be fixed as 20 mV and the phase circuits will be enabled/disabled at a load current Iload of 2 A. Therefore, as the AVP resistance $R_{AVP}$ is changed, the current threshold $I_{Th}$ also varies.

Figure 4:
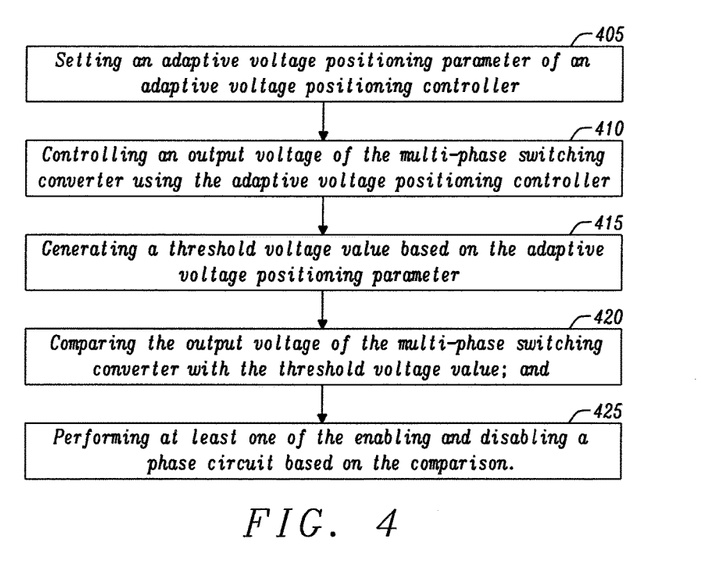
FIG. 4 is a flow diagram of a method of operating a multi-phase switching converter according to the present disclosure.

FIG. 4 shows a flow diagram of a method of operating a multi-phase switching converter comprising a plurality of phase circuits.

At step 405 an adaptive voltage positioning parameter of an adaptive voltage positioning controller is set. For example, this may be achieved by setting a gain of a DAC current source. At step 410, an output voltage of the multi-phase switching converter is controlled using the adaptive voltage positioning controller. At step 415, a threshold voltage value is generated based on the adaptive voltage positioning parameter. At step 420, the output voltage of the multi-phase switching converter is compared with the threshold voltage value. At step 425, a phase circuit is enabled or disabled based on the comparison.

Therefore, the threshold voltage value at which one or more phase circuits may be enabled or disabled can be adjusted depending on the AVP parameter.

The adaptive voltage positioning parameter may be associated with an adaptive voltage positioning resistance value. For example, the AVP parameter may be a constant value. As a result, one or more phase circuits may be enabled or disabled at a specific load current value which does not depend on a value of the AVP constant.

Figure 5:
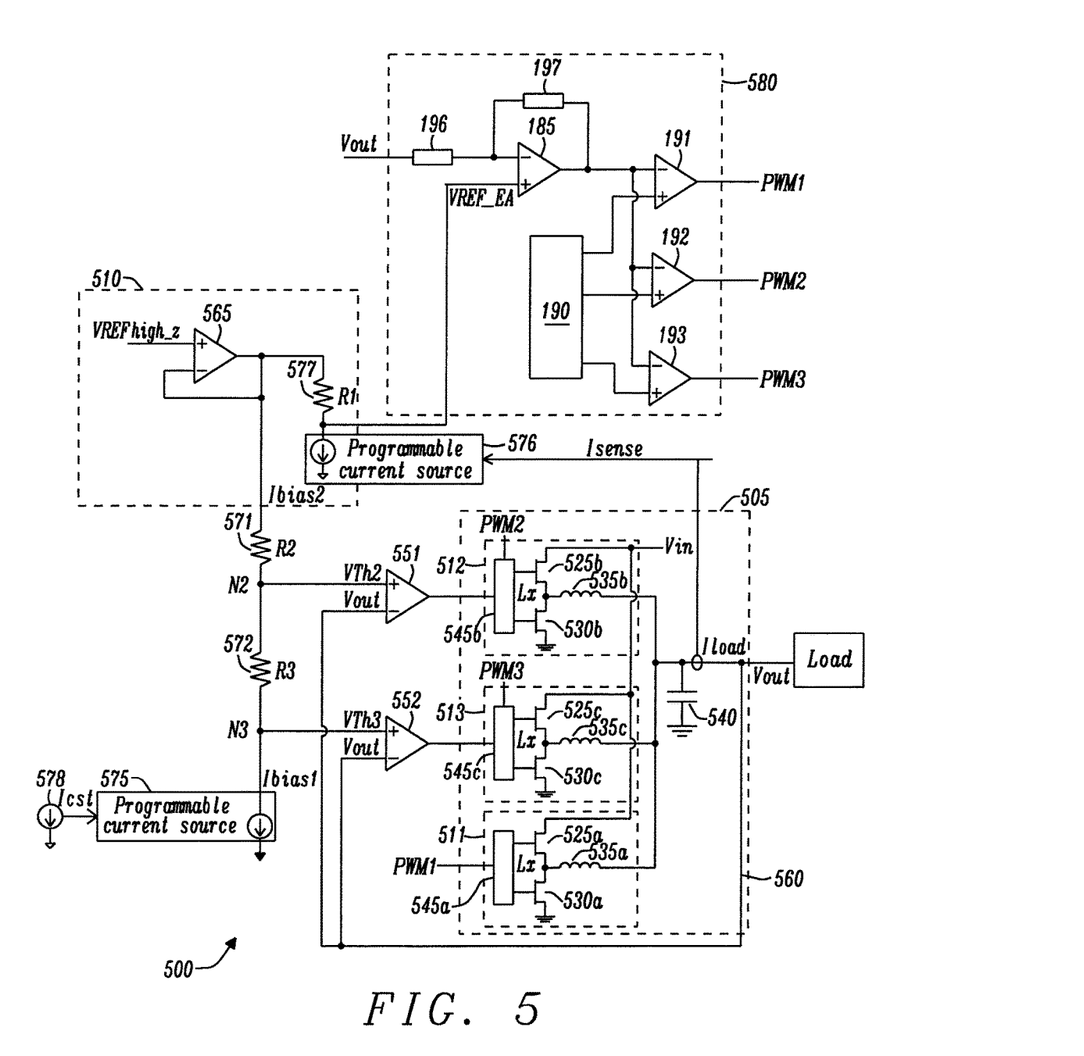
FIG. 5 is a diagram of a multi-phase switching converter according to an embodiment of the present disclosure.

FIG. 5 shows a diagram of a multi-phase buck converter 500 that includes a plurality of phase circuits 505 coupled to an AVP controller 510 and to a PWM controller 580.

The plurality of phase circuits 505 includes a first phase circuit 511, a second phase circuit 512 and a third phase circuit 513. Each phase circuit includes a high side power switch 525 and a low side power switch 530 that are connected to an inductor 535 via a switching node Lx. The inductor 535 has a first terminal coupled to the Lx node and a second terminal corresponding to the output of the phase circuit. The outputs of the phase circuits are coupled to a common node that is coupled to a load. A capacitor 540 has a first terminal coupled to the common node and a second terminal coupled to ground. Each converter circuit includes a gate driver 545 that has two outputs coupled to the high side power switch 525 and the low side power switch 530, respectively. The switching frequency of each phase circuit operates with a phase shift relative to the other converter circuits and therefore each phase circuit has an associated phase. In FIG. 5, three phase circuits are illustrated, however the number of phase circuits could be extended or decreased. The type of phase circuit may also vary. For example, a phase circuit may be implemented as a buck converter, or a boost converter or a buck-boost converter.

The PWM controller 580 has a first input for receiving the output voltage Vout of the multi-phase buck converter, a second input for receiving a voltage reference VREF_EA and a plurality of outputs for providing a control signal to each individual phase circuit. The number of outputs therefore matches the number of phase circuits present.

The PWM controller may be implemented in different fashions. In the present example, the PWM 580 is identical to the PWM controller 180 of FIG. 1. The components of the PWM 580 have reference numerals as indicated in FIG. 1.

The AVP controller 510 comprises an operational amplifier 565 configured as a unity gain amplifier, a resistor R1 577 and a first programmable current source 576. The unity gain amplifier has a first input for receiving a reference voltage, VREFhigh_z, a second input coupled to a potential divider and one output coupled to the first programmable current source 576 via the resistor R1 577. The output is coupled to the potential divider.

The first programmable current source 576 has an input for receiving a current proportional to the load current.

The potential divider is formed by a first resistor R2, 571 connected in series to a second resistor R3 572 at node N2. The potential divider has a first terminal coupled to the second input of the unity gain amplifier 565 and a second terminal coupled to a second programmable current source 575 at node N3. For example, the first and the second programmable current sources 576, 575 may be implemented as DAC current sources.

The potential divider is coupled to the plurality of phase circuits 505 via a plurality of comparators. An output of a first threshold comparator 551 is coupled to an input of the second phase circuit 512. An output of a second threshold comparator 552 is coupled to an input of the third phase circuit 513. The first threshold comparator 551 has a first input coupled to the output of the multi-phase converter, and a second input coupled to a node N2. The first input is connected to the output of the multi-phase converter via a connection 560, which may be a Kelvin connection. The second threshold comparator 552 has a first input coupled to the output of the multi-phase converter, and a second input coupled to a node N3. The first input is connected to the output of the multi-phase converter via the connection 560.

In operation, the first programmable current source 576 is set with a given value of the AVP resistor $R_{AVP}$, which would be suitable for a specific application. If the current source is a DAC current source, a digital code associated with a value of $R_{AVP}$ may be used to programme the current source.

The first programmable current source 576 then generates a current Ibias2 expressed as:

$$Ibias2 = Iload \times K_{AVP} \times K_{Isense} \quad (3)$$

Where $K_{AVP}$ is the gain of the DAC, $K_{Isense}$ is a constant associated with sensing of the load current Iload such that the sensing current $Isns=Iload \times K_{Isense}$.

The AVP resistor $R_{AVP}$ can be expressed as:

$$R_{AVP} = K_{AVP} \times K_{Isense} \times R1 \quad (4)$$

The AVP controller 510 provides a reference voltage $VREF_{EA}$, which is function of the current generated by the first programmable current source 576, expressed as:

$$VREF_{EA} = VREFhigh_z - R1 \times Ibias2 \quad (5)$$

$$VREF_{EA} = VREFhigh_z - Ravp \times Iload \quad (6)$$

where $VREFhigh_z$ is a constant reference voltage.

The PWM controller 580 receives the reference voltage $VREF_{EA}$, and the output voltage Vout, and provides three control signals PWM1, PWM2 and PWM3 to the gate drivers 545a, 545b and 545c or the first second and third phase circuits, respectively.

The PWM controller is used to regulate the voltage Vout, corresponding to the voltage at the point of load, near or equal to the reference voltage $VREF_{EA}$.

The second programmable current source 575 is set with a given value of the AVP resistor $R_{AVP}$. If the current source is a DAC current source, a digital code associated with a value of $R_{AVP}$ may be used to programme the current source.

The second programmable current source 575 then generates a current Ibias1 expressed as:

$$Ibias1 = Icst \times K_{AVP} \quad (7)$$

Where Icst is a constant current generated by the constant current generator 578.

The potential divider provides a first threshold voltage VTh2 and a second threshold voltage VTh3 at nodes N2 and N3 respectively. The first threshold voltage VTh2 is greater than the second threshold voltage VTh3, which can be expressed as:

$$VTh2 = VREFhigh_z - R2 \times Ibias1 \quad (8)$$

$$VTh3 = VREFhigh_z - (R2+R3) \times Ibias1 \quad (9)$$

The first threshold comparator 551 receives the voltage Vout and the first threshold voltage VTh2 and provides a signal to enable or disable the second phase circuit 512.

The second threshold comparator 552 receives the voltage Vout and the second threshold voltage VTh3 and provides a signal to enable or disable the third phase circuit 513.

The first voltage threshold Vth2 is associated with a first current threshold ITh2; and the second voltage threshold VTh3 is associated with a second current threshold ITh3.

The first current threshold ITh2 can be expressed as;

$$ITh2 = \frac{R2}{R1 \times K_{Isense}} \times Iconstant \quad (10)$$

The second current threshold ITh3 can be expressed as;

$$ITh3 = \frac{R2+R3}{R1 \times K_{Isense}} \times Iconstant \quad (11)$$

The currents ITh2 and ITh3 do not depend on $K_{AVP}$, therefore when $K_{AVP}$ changes, the currents ITh2 and ITh3 remain constant.

As mentioned above, $R_{AVP}$ can be changed by the user. For instance, if $R_{AVP}$ is set to 5 mΩ, and the threshold current is set to 4 A, then the threshold voltage is 20 mV in accordance with equation (2).

If the AVP resistance $R_{AVP}$ is changed to 10 mΩ, then the threshold voltage will be 40 mV, and the current threshold will be maintained at 4 A.

Therefore, the load current at which phases are enabled/disabled remains constant as $R_{AVP}$ is varied.

In an alternative embodiment, a single comparator may be used to control the second and third phase circuits. In this case the second and third phase circuits would be enabled or disabled together.

In an alternative embodiment, the number of phase circuits may be changed to a number N, where N is an integral number equal or greater than 2. The system would also include N comparators, each comparator being coupled to a corresponding phase circuit. In this case the potential divider would also include N resistors connected in series to provide N voltage thresholds.

By increasing the number of phase circuits and corresponding comparators it is possible to improve the flexibility of the system. For example, the switching converter may be able to respond to relatively smaller variations in load current.

Figure 6:
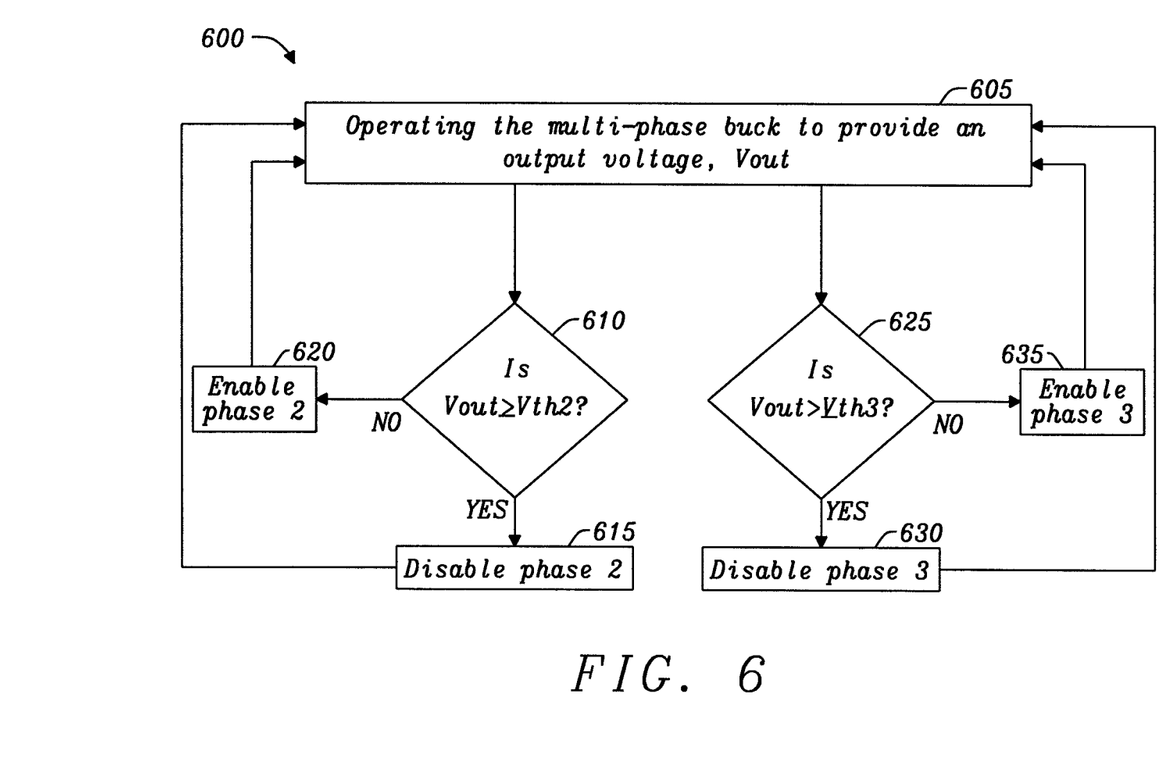
FIG. 6 is a flow diagram illustrating the working of the converter of FIG. 5.

FIG. 6 shows a flow chart 600 of the method of controlling the enabling and disabling of individual phases of the multi-phase buck converter illustrated in FIG. 5. At step 605 an output voltage is generated by the multi-phase buck converter. At step 610 Vout is compared with the first threshold voltage VTh2. If Vout is equal or greater than VTh2, the first threshold comparator 551 outputs a logic signal to the gate driver 545b to deactivate the second phase circuit 512 (step 615). For example, this may correspond to both the high and the low side switches of the phase circuit being switched off (open). If Vout is less than VTh2, the first threshold comparator 551 outputs a logic signal to the gate driver 545b to enable the second phase circuit 512 (step 620).

At step 625 Vout is compared with the second threshold voltage VTh3. If Vout is equal or greater than VTh3, the second threshold comparator 552 outputs a logic signal to the gate driver 545c to deactivate the third phase circuit 513 (step 630). For example, this may correspond to both the high and the low side switches of the phase circuit being switched off (open). If Vout is less than VTh3, the second threshold comparator 552 outputs a logic signal to the gate driver 545c to enable the third phase circuit 513 (step 635).

If both the second and the third phase circuits 512, 513 are disabled, then the multi-phase buck converter operates in single-phase mode with only the first phase circuit. The process flow is repeated and therefore the circuit responds in line with the flow chart during its operation.

Figure 7:
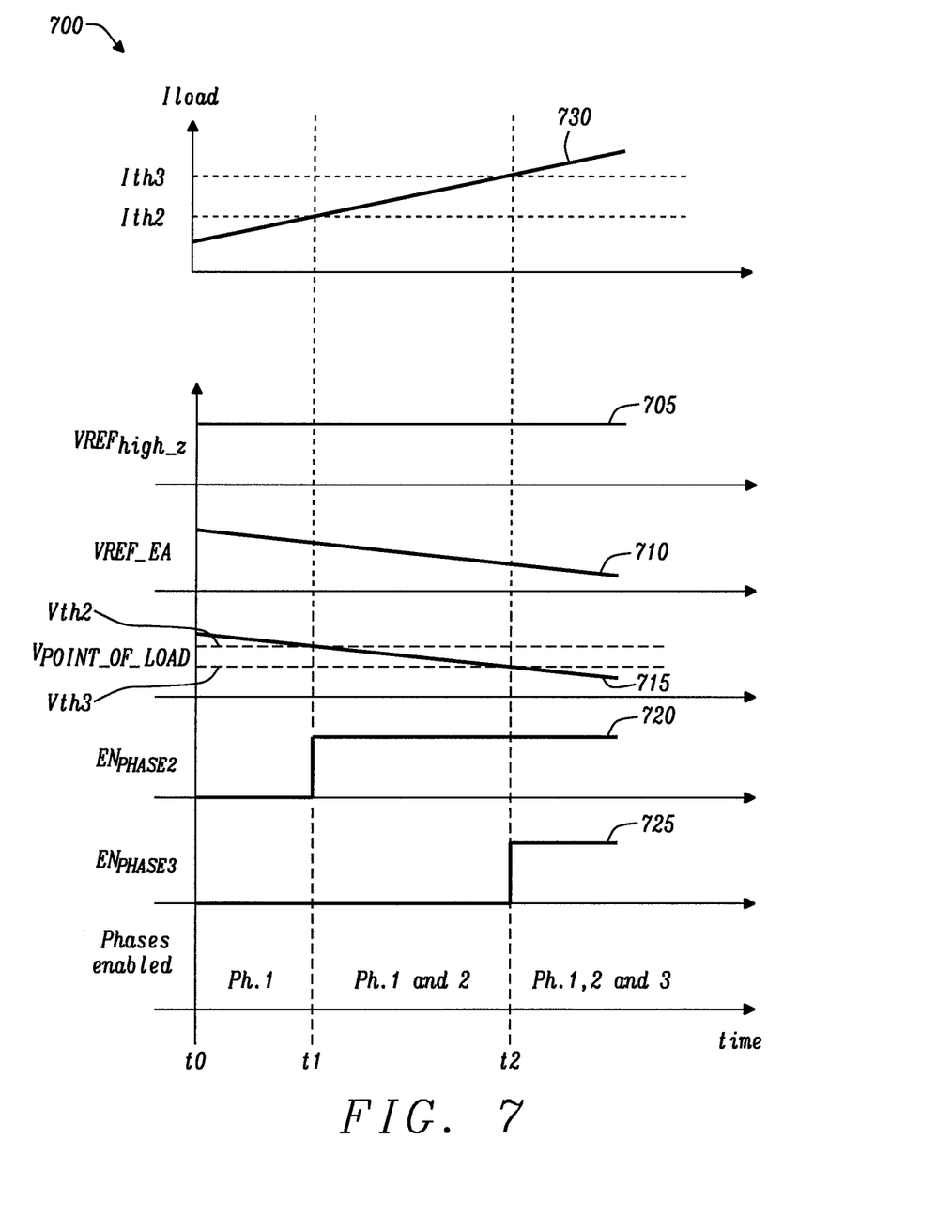
FIG. 7 is a time chart illustrating the operation of the switching converter of FIG. 5.

FIG. 7 shows the profiles of VREFhigh_z 705, VREF_EA 710, Vout 715, and Iload 730. FIG. 7 also illustrates the state, enabled or disabled of the second phase circuit 720, and of the third phase circuit 725.

A high signal corresponds to an enabled phase and a low signal corresponds to a disabled phase of phase circuit 2 and of phase circuit 3.

From time t0 to time t1, Vout 715 is greater than VTh2 and VTh3, and therefore only the first phase circuit is enabled. During this time, the multi-phase buck converter operates in single-phase mode. From time t1 to time t2, Vout is less than VTh2 but greater than VTh3. The second phase circuit is enabled. Therefore, between time t1 and t2, both the first and the second phase circuits are activated. After time t2, Vout is less than VTh3 resulting in the third phase circuit being enabled. After time t2 all three phases circuits are active.

Figure 8:
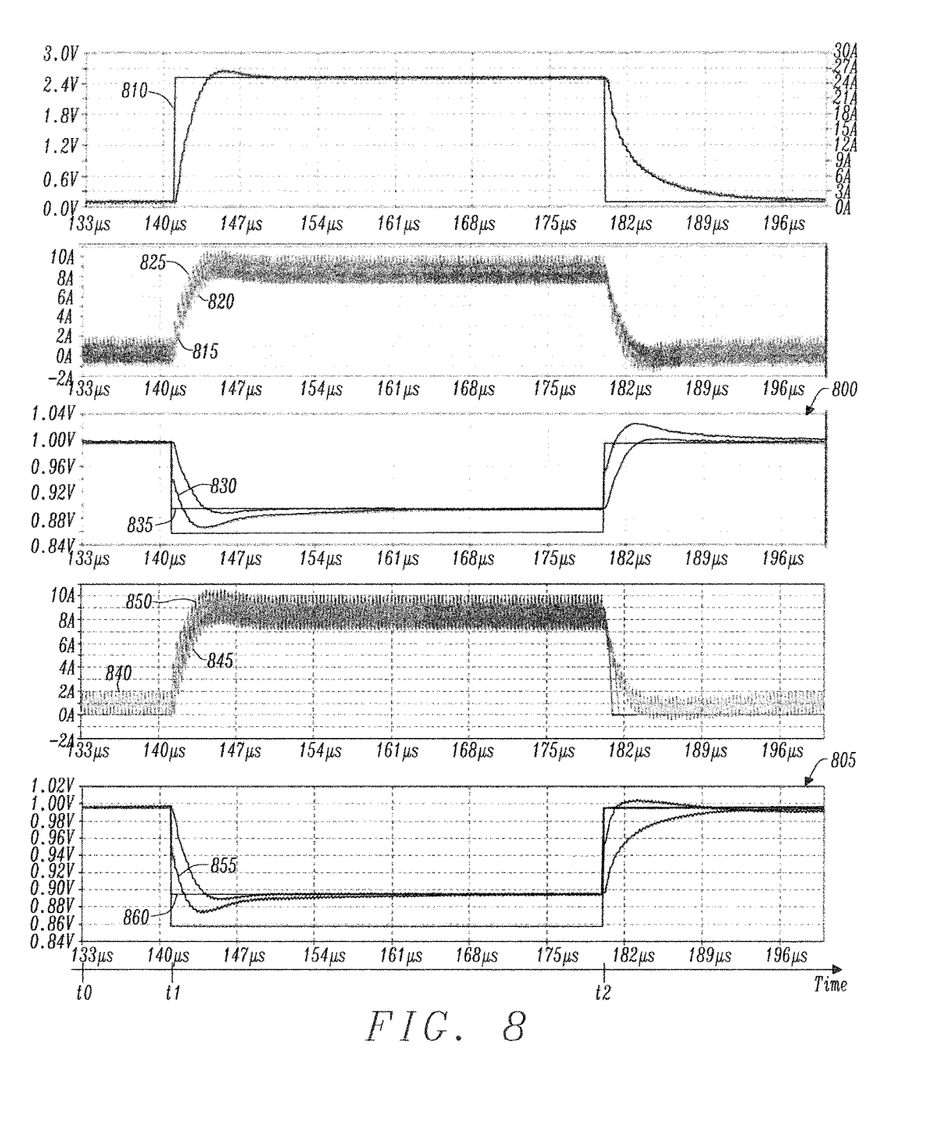
FIG. 8 is a time chart showing load transient simulations with and without activation and deactivation of phases.

FIG. 8 shows simulation results of the multi-phase buck converter operating under load transients for the case where the number of active phases is fixed 800 and for the case where phases are enabled or disabled 805 depending on the load current 810.

The following parameters, shown for the case where the number of active phases is fixed 800, is as follows: first phase circuit inductor current 815, second phase circuit inductor current 820, third phase circuit inductor current 825, output voltage 830, ideal output voltage 835. From a time t0 to a time t1 the load current 810 is light and all phase circuits provide current to the load. At the time t1 a load transient occurs wherein the load current 810 increases to a heavy load condition. At the time t1 the current flowing through the inductors increases. After the time t1 the output voltage 830 initially exhibits an undershoot when compared with the ideal output voltage 835. At a time t2 another load transient occurs wherein the load current 810 decreases to a light load condition. At the time t2 the current flowing through the inductors decreases. After the time t2 the output voltage 830 initially exhibits an overshoot when compared with the ideal output voltage 835.

The following parameters, shown for the case where phases are enabled or disabled 805 depending on the load current 810, is as follows: first inductor current 840, second inductor current 845, third inductor current 850, output voltage 855, ideal output voltage 860. From a time t0 to a time t1 the load current 810 is light and a single-phase circuit provides current to the load. At a time t1 a load transient occurs wherein the load current 810 increases to a heavy load condition. At the time t1 the second and third phase circuits are enabled and the current flowing through the inductors increases. After the time t1 the output voltage 855 initially exhibits an undershoot when compared with the ideal output voltage 860. At a time t2 another load transient occurs wherein the load current 810 decreases to a light load condition. At the time t2 the second and third phase circuits are disabled and current flowing through the inductors decreases. After the time t2 the output voltage 855 initially exhibits an overshoot when compared with the ideal output voltage 860. It can be observed that by disabling phase circuit 2 and phase circuit 3 to operate the multi-phase buck converter in single phase mode at time t2, the output voltage 855 exhibits a smaller overshoot and quicker return to the ideal output voltage 860 than observed for the output voltage 830 shown for the case where all phase circuits remain active 800.

Enabling and disabling phase circuits can result in the occurrence of mode bouncing. This phenomenon is more pronounced for low load current for example when the multi-phase switching converter passes from two enabled phase circuits to a single enabled phase circuit. In this case, the transient caused by disabling one phase circuit may result in a repeated cycle of enabling and disabling of the phase circuit. It is possible to prevent mode bouncing by adjusting momentarily the voltage threshold of the comparator controlling the phase circuit. In this way, it is possible to improve efficiency of the system for low load currents.

Figure 9:
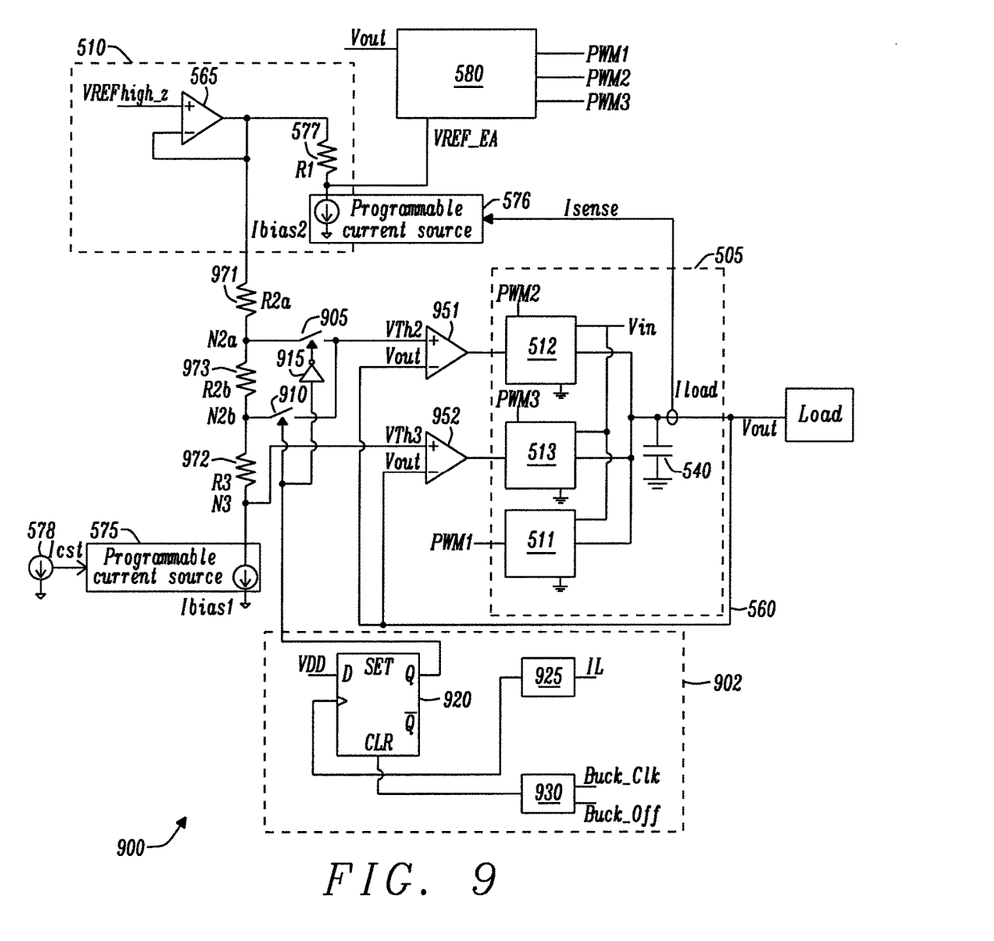
FIG. 9 is a diagram of a multi-phase buck converter provided with a threshold adjuster circuit.

FIG. 9 shows a diagram of a multi-phase buck converter 900 adapted to prevent mode bouncing. The multi-phase buck converter is similar to the multi-phase buck converter described with reference to FIG. 5, in which a threshold adjustor circuit 902 has been added and certain parts of the circuit have been modified. Other components have reference numerals as indicted above and shown in FIG. 5. For clarity, the components of the plurality of phase circuits 505 and of the PWM controller 580 are not shown. In the present example, the AVP controller 510 is identical to the AVP controller 510 of FIG. 5.

The potential divider is formed by three resistors, the first and second resistors R2a 971, and R3 972, as well as a third resistor R2b 973. The first resistor R2a, 971 is connected in series to the third resistor R2b 973 at a node N2a, and the third resistor R2b 973 is connected in series to the second resistor R3 972 at node a N2b. The potential divider is coupled to the plurality of phase circuits 505 via a first threshold comparator 951 and a second threshold comparator 952. An output of the first threshold comparator 951 is coupled to an input of the second phase circuit 512. An output of the second threshold comparator 952 is coupled to an input of the third phase circuit 513.

The first input of the first threshold comparator 951 is connected to the output of the multi-phase converter via a connection 560, which may be a Kelvin connection. The first threshold comparator 951 has a first input coupled to the output of the multi-phase converter, and a second input coupled to nodes N2a and N2b via a first switch 905 and a second switch 910 respectively. The first switch 905 has a first input terminal coupled to the node N2a and the second switch 910 has a first input terminal coupled to the node N2b. The first switch 905 and the second switch 910 are coupled to an output of the threshold adjustor circuit 902.

The second threshold comparator 952 has a first input coupled to the output of the multi-phase converter, and a second input coupled to the node N3. The first input is connected to the output of the multi-phase converter via the connection 560.

The threshold adjustor circuit 902 is formed by a memory device coupled to a zero-crossing detector and a counter. In this example, the memory device is provided by a flip-flop 920 coupled to zero-crossing detector 925, and to counter circuit 930. The flip-flop 920 has three inputs and one output. The first input D is coupled to a voltage VDD, where VDD corresponds to a high signal for example a logic one. The second input of the flip-flop 920 is coupled to an output of the zero-crossing detector 925. The zero-crossing detector 925 has an input for receiving an inductor current IL from the first phase circuit 511. The third input CLR is coupled to an output of the counter circuit 930. The counter circuit 930 has a first input coupled to a Buck_Clk signal and a second input coupled to Buck_Off signal. The output Q of the flip flop 920 is coupled to the second switch 910 and to the first switch 905 via an inverter 915.

In FIG. 9, three phase circuits are illustrated, however the number of phase circuits could be extended or decreased as required. For example, if the number of phase circuits is increased for instance from 3 to 4, the circuit would include an additional comparator and an additional threshold adjuster circuit. In this case the potential divider would be modified to include an additional resistance. The type of phase circuit may also vary. For example, a phase circuit may be implemented as a buck converter, or a boost converter or a buck-boost converter.

In operation, when the inductor current IL crosses zero, the zero-crossing detector 925 outputs a high signal, for example a logic 1, otherwise a low signal is provided for example a logic zero, thereby generating a clock signal for operation of the flip-flop 920. The clock signal is used to set the first output Q of the flip-flop 920 to the voltage VDD at the first input D, corresponding to the high signal. The counter circuit 930 receives the Buck_Clk signal and a Buck_Off signal. The Buck_Off signal represents a state of the second phase circuit 512. The Buck_Off signal is a high signal, for example a logic one when the second phase circuit 512 is disabled. Similarly, the Buck_Off signal is a low signal, for example a logic zero when the second phase circuit 512 is enabled.

When the second phase circuit 512 is disabled by the first threshold comparator 951, the counter circuit 930 outputs a high signal, for example a logic one, for a fixed time period. The fixed time period may be set by a number of cycles of the Buck_Clk. When the third input CLR of the D flip-flop 920 receives a high signal from the counter circuit 930, the first output Q of the D flip-flop 920 is a low signal, irrespective of the operation of the clock signal generated by the zero-crossing detector 925 and the first input D of the flip-flop 920. The fixed time period, corresponds to a set number of clock cycles after the second phase circuit 512 has been disabled defined by the counter circuit 930. During the fixed time period, the first switch 905 will be open and the second switch 910 will be closed, and node N2$b$ will be coupled to the second input of the first threshold comparator 951.

When the D flip-flop 920 outputs a high signal, the switch 910 receives a high signal that opens the switch 910 and the switch 905 receives a low signal that closes the switch 905. As a result, the second input of the first threshold comparator 951 is coupled to the node N2$a$. Similarly, when the D flip-flop 920 outputs a low signal, the second input of the first threshold comparator 95 is coupled to the node N2$b$.

When the second input of the first threshold comparator 951 is coupled to node N2$a$ the first threshold voltage VTh2 can be expressed as:

$$VTh2 = VTh2a = VREFhigh_z - R2a \times Ibias1 \qquad (12)$$

When the second input of the first threshold comparator 951 is coupled to N2$b$ the first threshold voltage VTh2 can be expressed as:

$$VTh2 = VTh2b = VREFhigh_z - (R2a + R2b) \times Ibias1 \qquad (13)$$

The second threshold voltage VTh3 can be expressed as:

$$VTh3 = VREFhigh_z - (R2a + R2b + R3) \times Ibias1 \qquad (14)$$

The first threshold voltage VTh2$a$ taken from the node N2$a$ is greater than the first threshold voltage VTh2$b$ taken from the node N2$b$, which is greater than the second threshold voltage VTh3.

The threshold voltages may be represented as threshold currents. The first voltage threshold VTh2 is associated with a first current threshold ITh2; and the second voltage threshold VTh3 is associated with a second current threshold ITh3.

When the second input of the first threshold comparator 951 is coupled to node N2$a$ the first threshold current ITh2 can be expressed as:

$$ITh2 = ITh2a = \frac{R2a}{R1 \times K_{Isense}} \times Iconstant \qquad (15)$$

When the second input of the first threshold comparator 551 is coupled to node N2$b$ the first threshold current ITh2$b$ can be expressed as:

$$ITh2 = ITh2b = \frac{R2a + R2b}{R1 \times K_{Isense}} \times Iconstant \qquad (16)$$

The second current threshold ITh3 can be expressed as:

$$ITh3 = \frac{R2a + R2b + R3}{R1 + K_{Isense}} \times Iconstant \qquad (17)$$

The currents ITh2 and ITh3 do not depend on $K_{AVP}$, therefore when $K_{AVP}$ changes, the currents ITh2 and ITh3 remain constant.

As mentioned above, $R_{AVP}$ can be changed by the user. Therefore, the load current at which phases are enabled/disabled remains constant as $R_{AVP}$ is varied.

The first threshold comparator 951 and the second threshold comparator 952 may exhibit hysteresis, wherein the output voltage Vout of the multi-phase converter at which a phase circuit is enabled and disabled is not equal. Consequently, in this case, an enabling threshold voltage and a disabling threshold voltage are associated with each phase circuit, where the enabling threshold voltage and the disabling threshold voltage of a phase circuit are unequal.

Under normal operation the node N2$a$ is coupled to the second input of the first threshold comparator 951 and the first threshold current ITh2=ITh2$a$ as defined by equation (d). When the second phase circuit 512 is disabled the node N2$b$ is coupled to the second input of the first threshold comparator 951 for a time period set by the counter circuit 930. Under these circumstances the first threshold current ITh2=ITh2$b$ as defined by equation (e). After the time period has elapsed, the node N2$a$ is coupled to the second input of the first threshold comparator 951 and the first threshold current ITh2=ITh2$a$ ITh2$b$ is greater than ITh2$a$.

Figure 10:
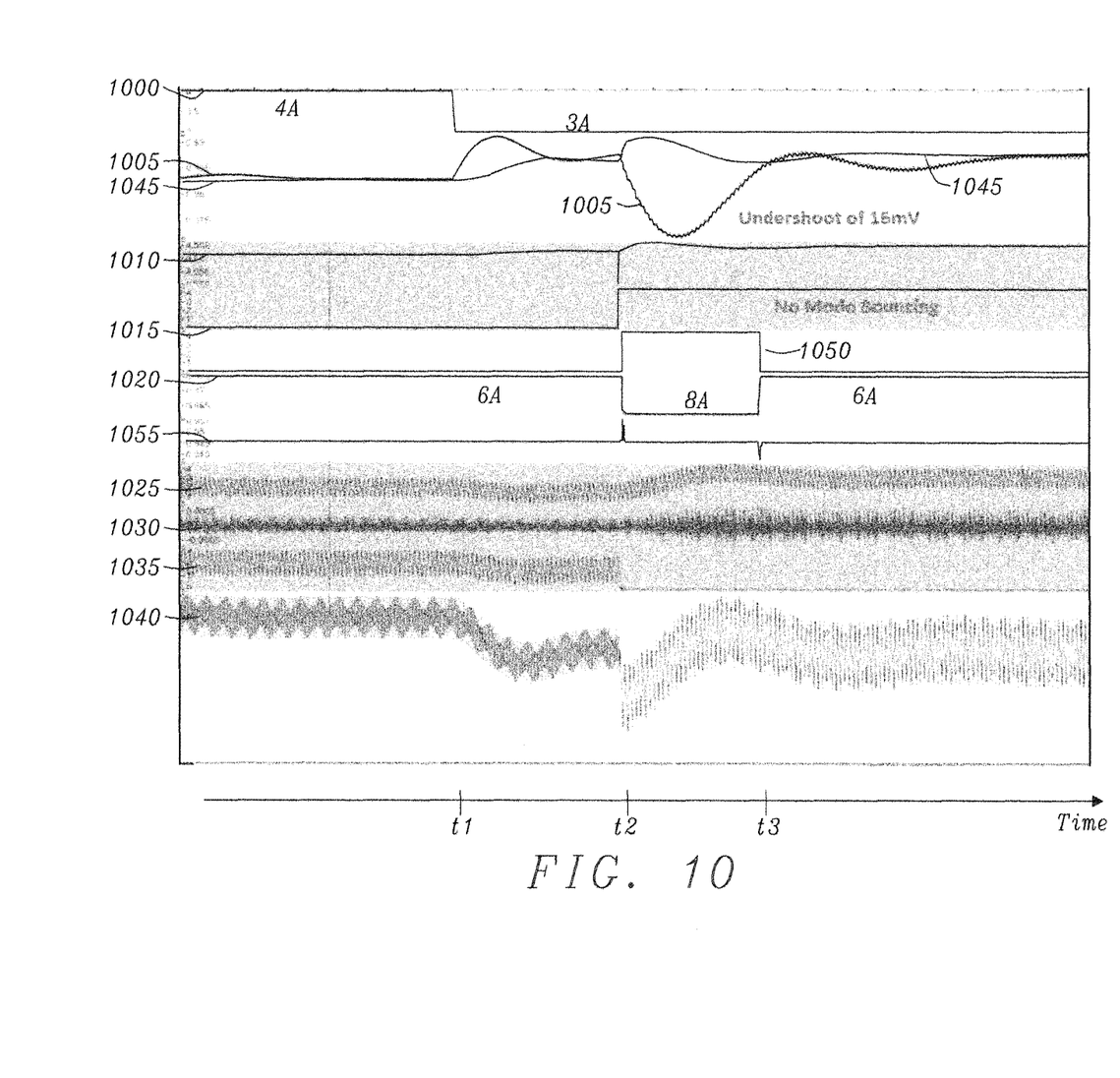
FIG. 10 is a time chart illustrating the operation of the converter of FIG. 9.

FIG. 10 shows simulation results of the multi-phase buck converter shown in FIG. 9. FIG. 10 illustrates the load current Iload 1000, the output voltage Vout of the multi-phase buck converter 1005, the reference voltage Vref_EA 1045, the state 1010 of the third phase circuit 513 where a high signal denotes that the third phase circuit 513 is disabled, the state, Buck_Off, 1015 of the second phase circuit 512 where a high signal denotes that the second phase circuit 512 is disabled, a timing duration signal 1050 for increasing an enabling threshold current of the second phase circuit 512 for a certain time period, an enabling threshold voltage 1020 of the second phase circuit 512, which is associated with the enabling threshold current of the second phase circuit 512, an enabling threshold voltage 1055 of the third phase circuit 513, the current in the first inductor 1025, the current in the third inductor 1030, the current in the second inductor 1035 and a sum 1040 of the currents through the first, second and third inductors.

The first threshold comparator 951 exhibits hysteresis such that the second phase circuit 512 is enabled when the load current Iload exceeds an enabling threshold current of 6 A and disabled when the load current Iload falls below a disabling threshold current of 4 A. The enabling threshold current is associated with the enabling threshold voltage; and the disabling threshold current is associated with a disabling threshold voltage.

Before time t1 the load current Iload 1000 is 4 A and the second phase circuit is enabled 1015. At time t1 the load current Iload 1000 decreases to 3 A which results in an overshoot of the output voltage Vout of the multi-phase buck converter 1005. At time t2 the circuit registers the change in the load current Iload 1000 and the second phase circuit 512 is disabled 1015. When the second phase circuit 512 is disabled, the enabling threshold voltage 1020 of the second phase circuit 512 decreases which corresponds to an increase in the enabling threshold current from 6 A to 8 A for a time period that is set by the counter circuit 930. The time period corresponds to a duration t3–t2 when the digital signal 1050 is high. In this example, the duration t3–t2 corresponds to 32 clock cycles. The output voltage Vout of the multi-phase buck converter 1005 exhibits a voltage undershoot of 16 mV during the time period. The decreased enabling threshold voltage of the second phase circuit 512 is such that the voltage undershoot does not lead to re-enabling of the second phase circuit 512 and to mode bouncing, wherein the second phase circuit 512 is repeatedly enabled and disabled. At the time t3, after 32 clock cycles when the output voltage Vout of the multi-phase buck converter 1005 has recovered from the voltage undershoot, the enabling threshold voltage 1020 of the second phase circuit 512 increases which corresponds to the enabling threshold current returning to 6 A. The third phase circuit 513 is disabled throughout as shown by the high signal of the state 1010 of the third phase circuit 513. The current 1030 through the third inductor is null.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. A method of operating a multi-phase switching converter comprising a plurality of phase circuits, the method comprising the steps of:
    setting an adaptive voltage positioning parameter of an adaptive voltage positioning controller;
    controlling an output voltage of the multi-phase switching converter using the adaptive voltage positioning controller;
    generating a threshold voltage value based on the adaptive voltage positioning parameter;
    comparing the output voltage of the multi-phase switching converter with the threshold voltage value; and
    performing at least one of enabling and disabling a phase circuit based on the comparison.

2. The method as claimed in claim 1, further comprising the steps of:
    enabling the phase circuit when the output voltage is less than the voltage threshold and
    disabling the phase circuit when the output voltage is more than the voltage threshold.

3. The method as claimed in claim 1, wherein generating a threshold voltage comprises
    generating a current that is a function of the adaptive voltage positioning parameter.

4. The method as claimed in claim 1, wherein generating a threshold voltage value comprises
    generating a first threshold value associated with a first phase circuit and
    generating a second threshold value associated with a second phase circuit, wherein the first threshold value is greater than the second threshold value.

5. The method as claimed in claim 4, further comprising the steps of:
    enabling the first circuit when the output voltage is less than the first voltage threshold;
    disabling the first circuit when the output voltage is more than the first voltage threshold;
    enabling the second circuit when the output voltage is less than the second voltage threshold and
    disabling the second circuit when the output voltage is more than the second voltage threshold.

6. The method as claimed in claim 1, further comprising the step of:
    adjusting the threshold voltage value, when a phase circuit is enabled or disabled.

7. The method as claimed in claim 6, wherein the threshold voltage value is adjusted momentarily for a specific time period.

8. The method as claimed in claim 6, wherein the threshold voltage value is decreased when a phase circuit is disabled.

9. A multi-phase switching converter for providing an output voltage, comprising
    a plurality of phase circuits;
    an adaptive voltage positioning controller coupled to the plurality of phase circuits, comprising a programmable circuit for setting an adaptive voltage positioning parameter;
    a voltage threshold generator coupled to the plurality of phase circuits adapted to generate a first voltage threshold value based on the adaptive voltage positioning parameter;
    a first comparator coupled to the voltage threshold generator and to a first phase circuit, adapted to compare the output voltage with the first threshold value and to provide a first signal to perform at least one of enabling or disabling the first phase circuit based on the comparison.

10. The multi-phase switching converter as claimed in claim 9,
    wherein the voltage threshold generator is adapted to generate a second voltage threshold value based on the adaptive voltage positioning parameter, wherein the first threshold value is greater than the second threshold value; and
    the multi-phase switching converter comprising a second comparator coupled to the voltage threshold generator and to a second phase circuit, the second comparator being adapted to compare the output voltage with the second threshold value and to provide a second signal to perform at least one of enabling or disabling the second phase circuit based on the comparison.

11. The multi-phase switching converter as claimed in claim 10, wherein the first signal is adapted to enable the first circuit when the output voltage is less than the first voltage threshold and to disable the first circuit when the output voltage is equal or greater than the first voltage threshold, and wherein the second signal is adapted to enable the second circuit when the output voltage is less than the second voltage threshold and to disable the second circuit when the output voltage is equal or greater than the second voltage threshold.

12. The multi-phase switching converter as claimed in claim 9, wherein the adaptive voltage positioning parameter is associated with an adaptive voltage positioning resistance value.

13. The multi-phase switching converter as claimed in claim 9, further comprising a voltage threshold adjuster coupled to the voltage threshold generator, the voltage threshold adjuster being adapted to adjust the threshold voltage value when a phase circuit enabled or disabled.

14. The multi-phase switching converter as claimed in claim 13, wherein the threshold voltage value is adjusted momentarily for a specific time period.

15. The multi-phase switching converter as claimed in claim 13, wherein the threshold voltage value is decreased when a phase circuit is disabled.

* * * * *